(12) United States Patent
Heinonen et al.

(10) Patent No.: US 6,807,147 B1
(45) Date of Patent: Oct. 19, 2004

(54) METHODS AND APPARATUS FOR USE IN OBTAINING FRAME SYNCHRONIZATION IN AN OFDM COMMUNICATION SYSTEM

(75) Inventors: Jari M. Heinonen, Seattle, WA (US); Michael R. Hirano, Redmond, WA (US); Steven E. McMeekin, Nederland, CO (US)

(73) Assignee: AT&T Wireless Services, Inc., Redmond, WA (US)

(*) Notice: Subject to any disclaimer, the term of this patent is extended or adjusted under 35 U.S.C. 154(b) by 931 days.

(21) Appl. No.: 09/592,961

(22) Filed: Jun. 13, 2000

Related U.S. Application Data (60) Provisional application No. 60/140,905, filed on Jun. 23, 1999.

(51) Int. Cl.[7] .................. H04J 11/00; G01R 31/08; H04B 7/212
(52) U.S. Cl. .................. 370/208; 370/252; 370/347; 375/362
(58) Field of Search ................... 370/208, 210, 370/252, 350, 321, 333, 347, 442, 503; 375/293, 349, 362, 368; 455/150.1

(56) References Cited

U.S. PATENT DOCUMENTS

| | | | |
|---|---|---|---|
| 5,444,697 A | 8/1995 | Leung et al. | 370/19 |
| 5,652,772 A | 7/1997 | Isaksson et al. | 375/367 |
| 5,867,478 A * | 2/1999 | Baum et al. | 370/203 |
| 6,058,101 A | 5/2000 | Huang et al. | 370/208 |
| 6,487,252 B1 * | 11/2002 | Kleider et al. | 375/260 |
| 6,643,281 B1 * | 11/2003 | Ryan | 370/350 |

\* cited by examiner

*Primary Examiner*—Duc Ho
(74) *Attorney, Agent, or Firm*—INCAPLAW; Terrance A. Meador (57) ABSTRACT

An orthogonal frequency division multiplexing (OFDM) communication system includes base units which simultaneously transmit pilot tones in a predetermined pilot tone pattern during one or more time slots of a message slot. OFDM signals are received within a time slot; an OFDM signal level is determined at each frequency of a plurality of pilot tone frequencies; the signal levels and the predetermined pilot tone pattern are correlated; and a pattern detection value based on performing the correlation is generated and stored. This process is repeated for each time slot of a plurality of time slots. This process may be repeated for a plurality of message frame durations to produce a plurality of averaged pattern detection values, following which the plurality of averaged pattern detection values and a predetermined message frame pattern may be correlated. Then, a boundary of a message slot may be detected based on the correlation.

30 Claims, 11 Drawing Sheets

METHODS AND APPARATUS FOR USE IN OBTAINING FRAME SYNCHRONIZATION IN AN OFDM COMMUNICATION SYSTEM

RELATED APPLICATION

This Application claims the benefit of U.S. Provisional Application Serial No. 60/140,905, filed Jun. 23, 1999, and entitled "Method for Communication in a Personal Wireless Access Network," which is incorporated herein by reference.

BACKGROUND OF THE INVENTION

1. Field of the Invention

The present invention relates generally to the field of frame synchronization in orthogonal frequency division multiplexing (OFDM) communication systems.

2. Description of the Related Art

Orthogonal frequency division multiplexing (OFDM) is a robust technique for efficiently transmitting data over a channel. This technique uses a plurality of sub-carrier frequencies (sub-carriers) within a channel bandwidth to transmit the data. These sub-carriers are arranged for optimal bandwidth efficiency compared to more conventional transmission approaches, such as frequency division multiplexing (FDM), which waste large portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier. Also, OFDM is much less susceptible to inter-symbol interference (ISI) from the use of a guard time between successive bursts.

Although OFDM exhibits several advantages, prior art implementations of OFDM also exhibit several difficulties and practical limitations. One difficulty with implementing OFDM transmission systems is that of achieving timing and frequency synchronization between the transmitter and the receiver. Another difficulty is achieving appropriate frame synchronization after some time and frequency synchronization has occurred. Locating frame boundaries in a slotted-ALOHA type control channel of an OFDM system is difficult because such systems are highly sensitive to frequency and timing errors.

In such a system, each base unit transmits a broadcast point-to-multipoint message during an allotted time such that all base units transmit a broadcast message within a period of time round-robin style. For frame synchronization, each receiver unit in the system receives the broadcast messages and must determine (1) the general location of the broadcast message within the frame structure; and (2) the broadcast message that originates from its particular serving base unit. These objectives are typically achieved in conventional systems by separate mechanisms. For example, item (1) usually requires a synchronization sequence as a frame marker. To detect the synchronization sequence, the receiver unit has to be synchronized in time to some degree. In OFDM systems, this requirement may be only a fraction of a digitized time sample, which thereby necessitates some complicated processing. Item (2) is typically performed by decoding some message broadcast by the base unit, which can only be performed after tight time and frame synchronization.

Accordingly, there is an existing need to provide alternatives to frame synchronization in OFDM communication systems. More particularly, there is an existing need to provide alternatives to frame synchronization that do not require the degree of time synchronization required in other approaches.

SUMMARY OF THE INVENTION

Methods and apparatus for use in obtaining frame synchronization in an Orthogonal Frequency Division Multiplexing (OFDM) communication system are described. In one exemplary method the steps involve, for each time slot of a plurality of time slots within a duration of a message frame, where during some of the time slots each base unit simultaneously transmits a plurality of pilot tones in a predetermined pilot tone pattern and where during some other time slots each base unit does not simultaneously transmit the plurality of pilot tones in the predetermined pilot tone pattern: receiving OFDM signals within a time slot; determining a signal level in the OFDM signals at each frequency of a plurality of pilot tone frequencies; performing a correlation between the signal levels and the predetermined pilot tone pattern; and generating and storing a pattern detection value based on performing the correlation. The method includes the further steps of repeating, for a plurality of message frame durations, the above steps of repeated receiving, determining, performing, and generating to produce a plurality of averaged pattern detection values; performing a correlation between the plurality of averaged pattern detection values and a predetermined message frame pattern; and detecting a boundary of a message slot based on performing the correlation.

In another exemplary method, which is related to and combinable with the above-described method, the following steps are involved. For each message frame of a plurality of message frames during which each base unit takes a turn in transmitting a plurality of pilot tone signals: receiving OFDM signals within a message frame; determining a signal level of a plurality of pilot tones in the OFDM signals; and generating a rank of the plurality of base units in accordance with the signal levels. The method further includes repeating the following steps if necessary until a serving base unit is confirmed: selecting a candidate base unit from the rank; decoding a message within the message frame associated with the selected candidate base unit; comparing a base unit identifier in the message and a prestored base unit identifier; and confirming that the candidate base unit is the serving base unit based on a match between the base unit identifier and the prestored base unit identifier.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Methods and apparatus for use in obtaining frame synchronization in an Orthogonal Frequency Division Multiplexing (OFDM) communication system are described. As it is referred to herein, frame synchronization involves the procedure by which a receiver unit identifies a boundary of the time slots of its own serving base unit. In the embodiment described herein, frame synchronization is performed on a control channel slotted-ALOHA, where messages are modulated onto time series "bursts" occupying time slots. The frame synchronization described herein occurs after the receiver unit has achieved coarse time synchronization and coarse frequency synchronization. By coarse time synchronization, it is meant that time is synchronized to a time slot within a few digitized time samples; by coarse frequency synchronization, it is meant that most of the frequency error has been eliminated.

In basic form, a frame boundary is located by searching for pilot tones that are embedded within the frame structure using an energy detector and correlator combination. Base units are ranked based on received signal strengths of the pilots; the base unit having the strongest signal is considered to be the candidate base unit, which is based on the assumption that the receiver unit had been previously assigned to the base unit having the strongest link therebetween. Once the frame boundary is located, a "tighter" time alignment is performed in connection with the base unit to allow demodulation of the control channel messages.

Figure 1:
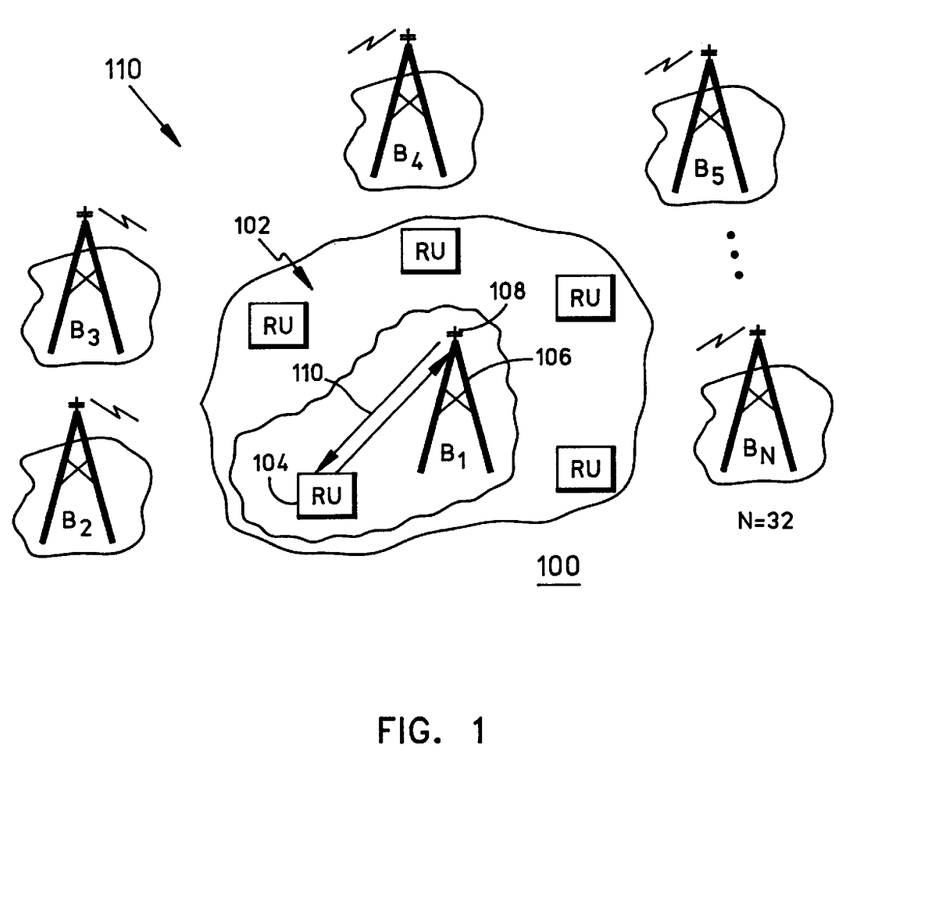
FIG. 1 is a diagram of a wireless communication system, such as a fixed wireless system utilizing orthogonal frequency division multiplexing (OFDM) communication techniques, which includes one or more base units and one or more receiver units.

FIG. 1 is an illustrative representation of a wireless communication system 100 which utilizes orthogonal frequency division multiplexing (OFDM) or OFDM-like communication methodologies. Wireless communication system 100 includes a plurality of base units 110, such as a base unit 106 having one or more antennas 108, and a plurality of remote units 102 ("RUs" or "receiver units"), such as a remote unit 104. Base and remote units communicate via radio frequency (RF) signals, such as RF signals 110 between base unit 106 and remote unit 104. Wireless communication system 100 may make use of a number of different communication techniques, such as frequency division multiplie access (FDMA), time division multiple access (TDMA), or time division duplex (TDD). Although each receiver unit is associated with a single base unit for communication, it can and does receive signals from nearby base units. Preferably, wireless communication system 100 is a fixed wireless system (FWS), where each one of base units 110 provides telephone and high-speed data communication for a number of fixed-location subscribers equipped with an RU within a specified coverage area.

Figure 2:
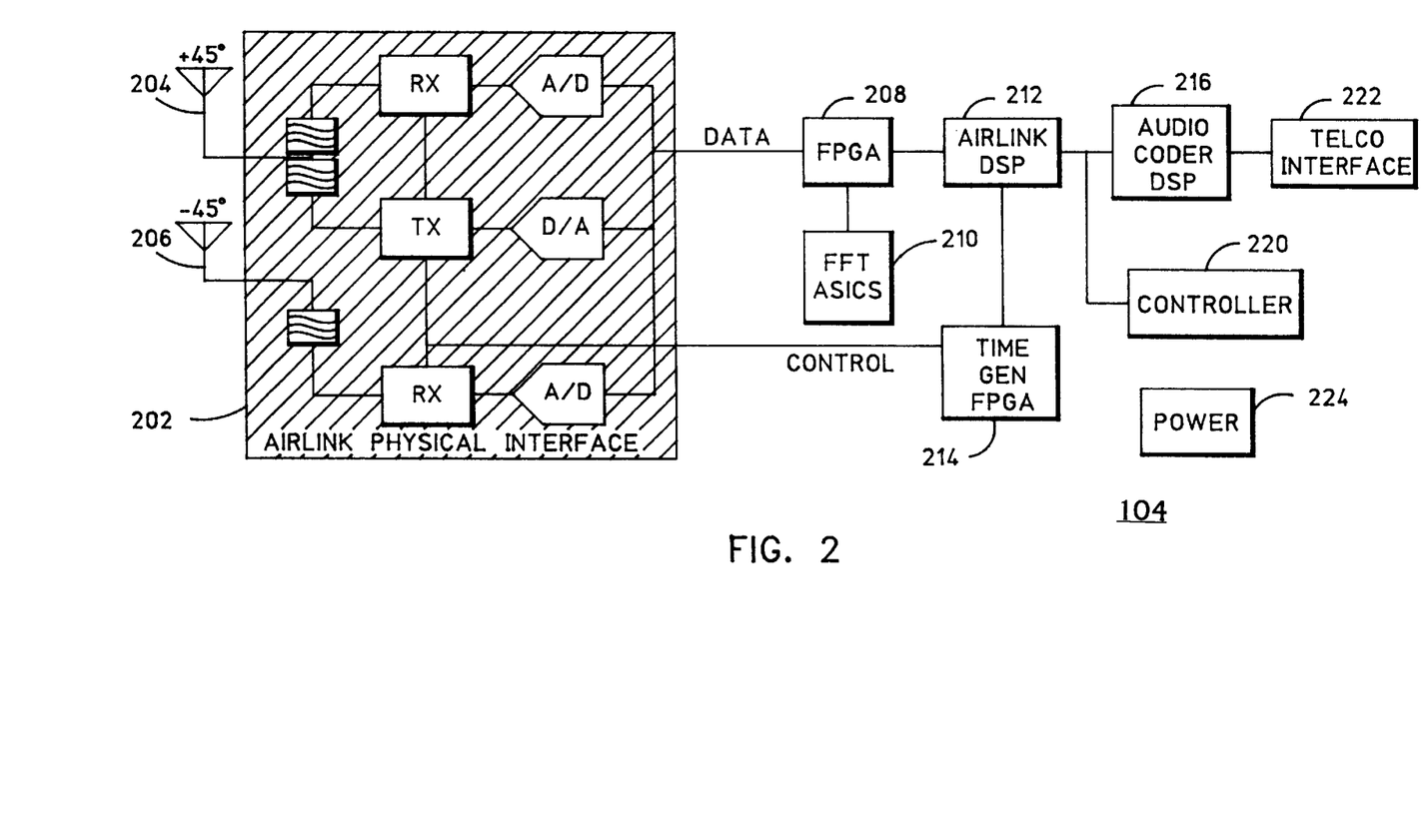
FIG. 2 is a block diagram of electronic components of a receiver unit in the wireless communication system of FIG. 1.

FIG. 2 is a schematic block diagram of receiver unit 104 of wireless communication system 100. As shown, receiver unit 104 has electronic circuitry 200 which includes diversity antennas 204 and 206 coupled to an airlink physical interface 202, a field programmable gate array (FPGA) 208, two Fast Fourier Transform (FFT) application-specific integrated circuits (ASICs) 210, an airlink digital signal processor (DSP) 212, a time generator FPGA 214, an audio coder DSP 216, a controller 220, a telco interface 222, and power supply circuitry 224. Airlink physical interface 202 has a two-branch radio frequency (RF) receiver with two analog-to-digital (A/D) converters, and a single branch RF transmitter with a digital-to-analog (D/A) converter. FFT ASICs 210 provide a frequency-to-time/time-to-frequency domain translation engine for OFDM waveforms. Airlink DSP 212 performs airlink physical layer processing and audio coder DSP performs speech vocoder functions. Time generation FPGA 214 provides a serial time division multiplex (TDM) interface along with hardware support for RF control. Telco inteface 222 has a subscriber link interface circuit to provide an interface to a customer's telephone wiring. Controller 220 provides control for most of these devices, and power supply circuitry 224 provides electrical power for operation of the devices. Preferably, airlink and audio coder DSPs 212 and 216 utilize DSPs provided by Texas Instruments and controller 220 utilizes an MC68360 Quad Integrated Communications Controller (QUICC) CPU provided by Motorola, Inc.

Figure 3:
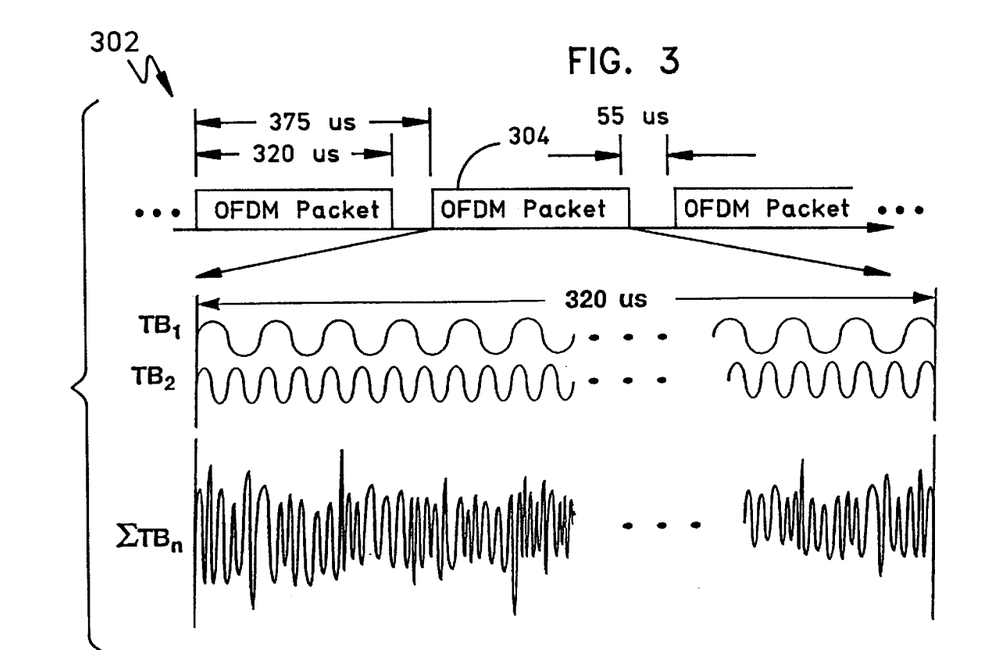
FIG. 3 is a timing diagram showing radio frequency (RF) OFDM signals and OFDM packets in the wireless communication system.
Figure 4:
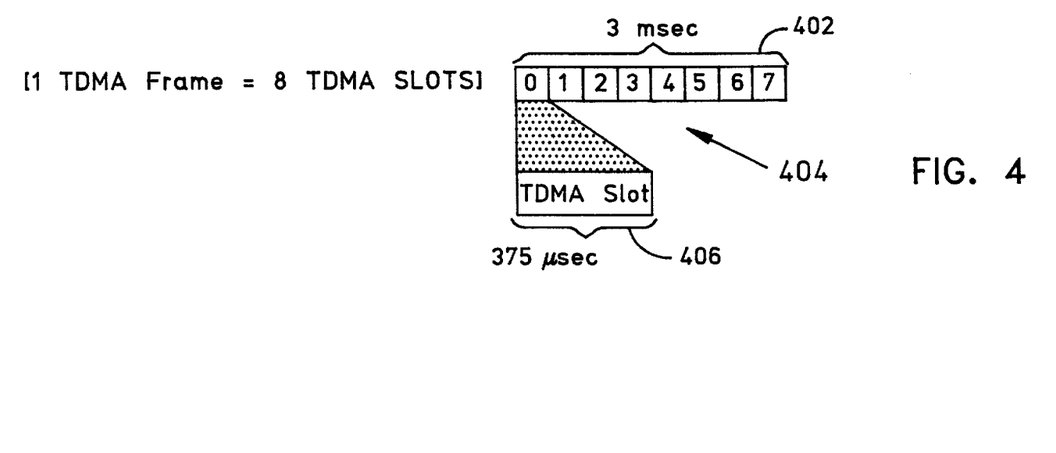
FIG. 4 is an illustrative representation of the relationship between time slots and time frames utilized in the wireless communication system.

Referring now to FIG. 3, each base unit of wireless communication system 100 broadcasts a plurality of OFDM packets 302, such as an OFDM packet 304, to a corresponding receiver unit. A new OFDM packet is broadcast once every predetermined time period. Each predetermined time period is associated with a time slot, such as a time slot 406 of FIG. 4. As indicated in FIG. 4, a plurality of consecutive time slots 404 corresponds to a time frame 402. In the preferred embodiment shown, each time slot has a duration of 375 microseconds, each OFDM packet is 320 microseconds in length, and each time frame corresponds to 8 time slots for a duration of 3 milliseconds.

In this way, each base unit transmits "traffic tones" and "pilot tones" to a corresponding remote unit. In general, traffic tones are utilized for the communication of voice and/or data, whereas pilot tones are utilized for control. The amplitude and phase of pilot tones remain relatively constant over time, while the amplitude and phase of traffic tones vary over time. To receive the traffic tones and pilot tones, each receiver unit samples the OFDM waveform at a sampling rate to generate time domain samples and converts the time domain samples into frequency domain signals (e.g., traffic or pilot tones).

Figure 5:
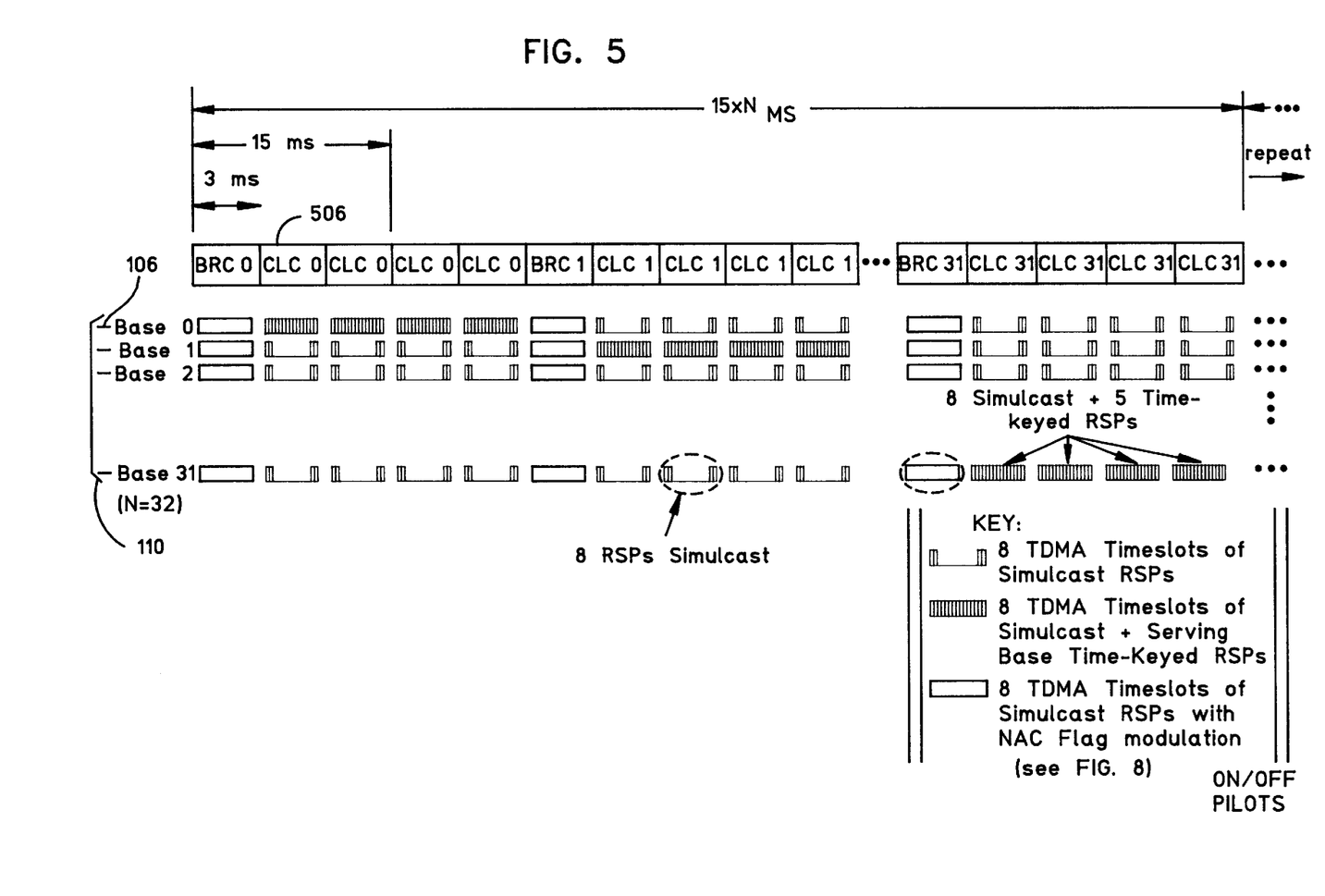
FIG. 5 an illustrative representation of the timing and frequency relationships of message slots, message frames, and pilot tones in the wireless communication system.
Figure 6:
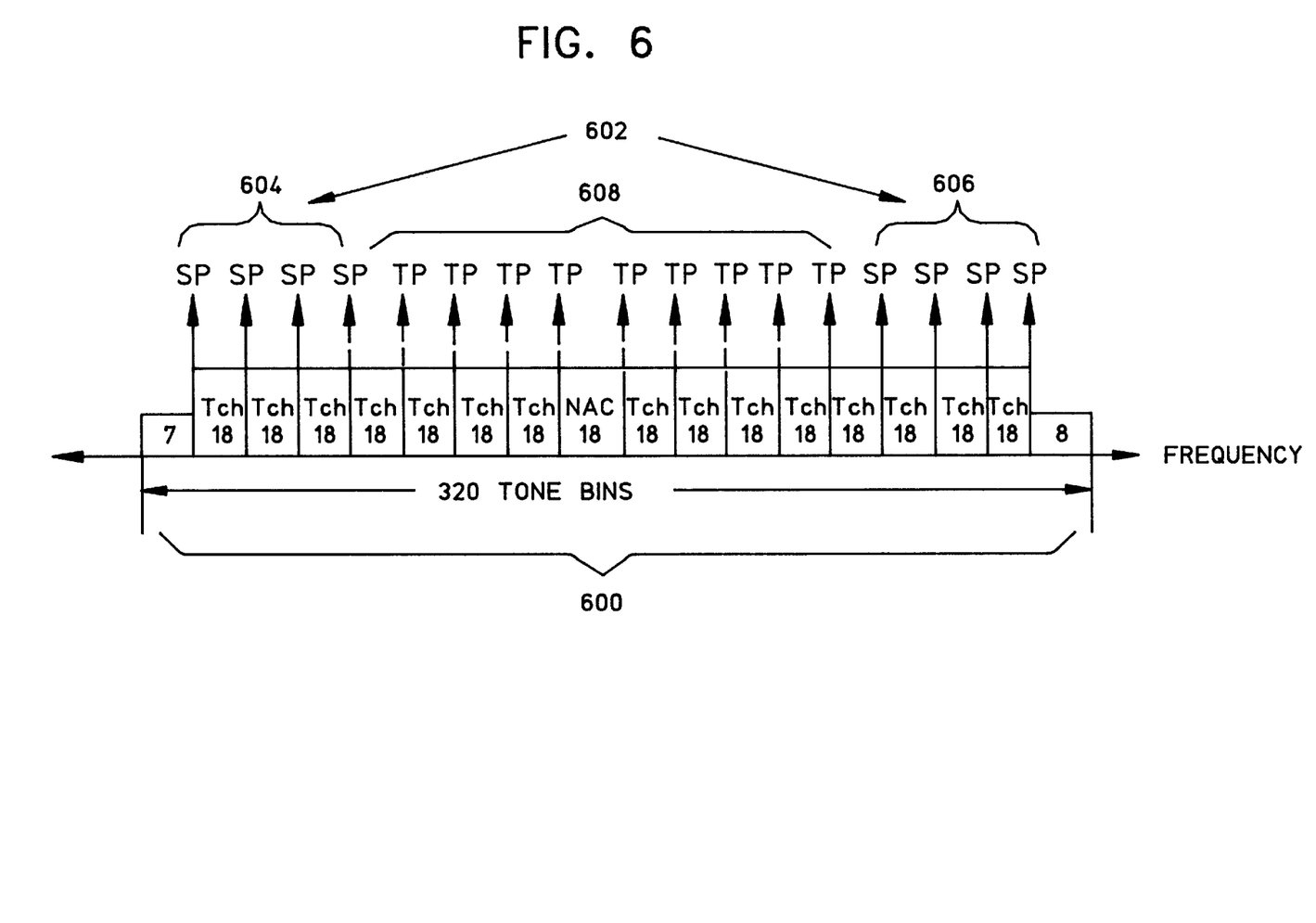
FIG. 6 is an illustrative representation of the frequency layout of pilot tones and traffic tones utilized in the wireless communication system.

FIG. 5 is an illustrative representation of timing relationships in the broadcasting of pilot tones for each base unit of a plurality of base units 110, such as a base unit 106. For each time frame, such as a time frame 506, pilot tones are arranged in frequency as described generally in relation to FIG. 6. A set of pilot tones 600 represented in FIG. 6 includes a subset of simulcast pilot tones 602 (each designated "SP" and by solid arrows), and may include a subset of time-keyed pilot tones 608 (each designated "TP"). As indicated in FIG. 6, traffic tones (designated "Tch") are positioned in frequency in between adjacent pilot tones. Referring back to FIG. 5, each one of base units 110 broadcasts time-keyed pilot tones only a portion of the time. More particularly, each base unit of the plurality of base units 110 takes a turn in broadcasting time-keyed pilot tones within a different message frame, as indicated in FIG. 5. That is, the 32 base units take turns in transmitting the "all-on" pilot tones in a round-robin fashion. The plurality of base units 110 continually repeats such broadcasting. Time-keyed pilot tones are utilized for frame synchronization which will be described herein.

In the preferred embodiment, and as shown in FIG. 6, wireless communication system 100 of FIG. 1 utilizes 8 simulcast pilot tones (4 positioned in frequency on each side of the time-keyed pilot tones), 9 time-keyed pilot tones, and 18 traffic tones positioned in between adjacent pilot tones. Also preferably, each frequency band has a bandwidth $f_{band}=1$ MHz and each tone has a 3125 Hz bandwidth (1 FFT tone bin width). The frequency gap $f_s$ between adjacent pilot tones is (19*59.375 kHz (18 FFT tone bins) and the frequency gap $f_{int}$ between adjacent frequency bands is 46.875 kHz (15 FFT tone bins). In addition, 18 traffic tones (18 FFT tone bins) are positioned in between adjacent pilot tones.

Figure 7:
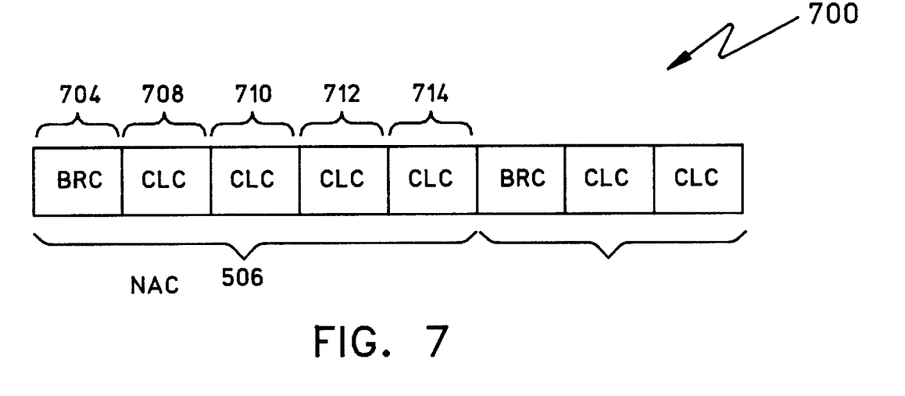
FIG. 7 is an illustrative representation of a slot/frame structure utilized in the wireless communication system.

FIG. 7 is an illustrative representation of a slot/frame structure 700 utilized in wireless communication system 100. Slot/frame structure 700 corresponds to that which is used for a Network Access Channel (NAC) or control channel during transmission by the plurality of base units 110 (downlink). This control channel is slotted-ALOHA, where each of the messages are modulated onto timeseries bursts occupying time slots. Message frame 506 as shown in FIG. 7 is defined by a plurality of message slots 706. Each message slot contains a message, including a Broadcast Channel (BRC) message in a message slot 704; and a Common Link Channel (CLC) message in a message slot 708, a message slot 710, a message slot 712, and a message slot 714. BRC messages are point-to-multipoint and are primary used for broadcasting cell-wide information and for receiver unit installation; CLC messages provide downlink information for call setup and maintenance operations. Within each message slot are a plurality of time slots (i.e., TDMA time slots; see FIG. 4). As indicated in FIG. 7, as well as FIG. 5, the structure of message frame 506 is continually understood by each base unit.

Figure 8:
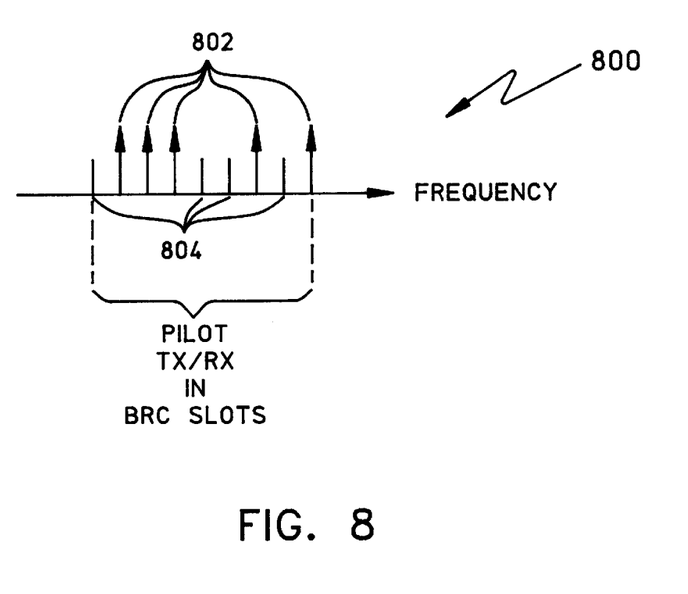
FIG. 8 is an illustrative representation of a predetermined pilot tone pattern utilized in the wireless communication system.

FIG. 8 is an illustrative representation of a pilot tone layout 800 of some of the pilot tones utilized in wireless communication system 100. More particularly, pilot tone layout 800 in FIG. 8 corresponds to that which is transmitted by base units 110 during BRC message slots (e.g., during message slot 704 of FIG. 7). In this embodiment, pilot tone layout 800 has active pilot frequency locations 802 (positions 2, 3, 4, 7, and 9) and inactive pilot frequency locations 804 (positions 1, 5, 6, and 8). This pattern may be referred to later as the "predetermined pilot tone pattern," although other suitable patterns may be utilized.

Figure 9:
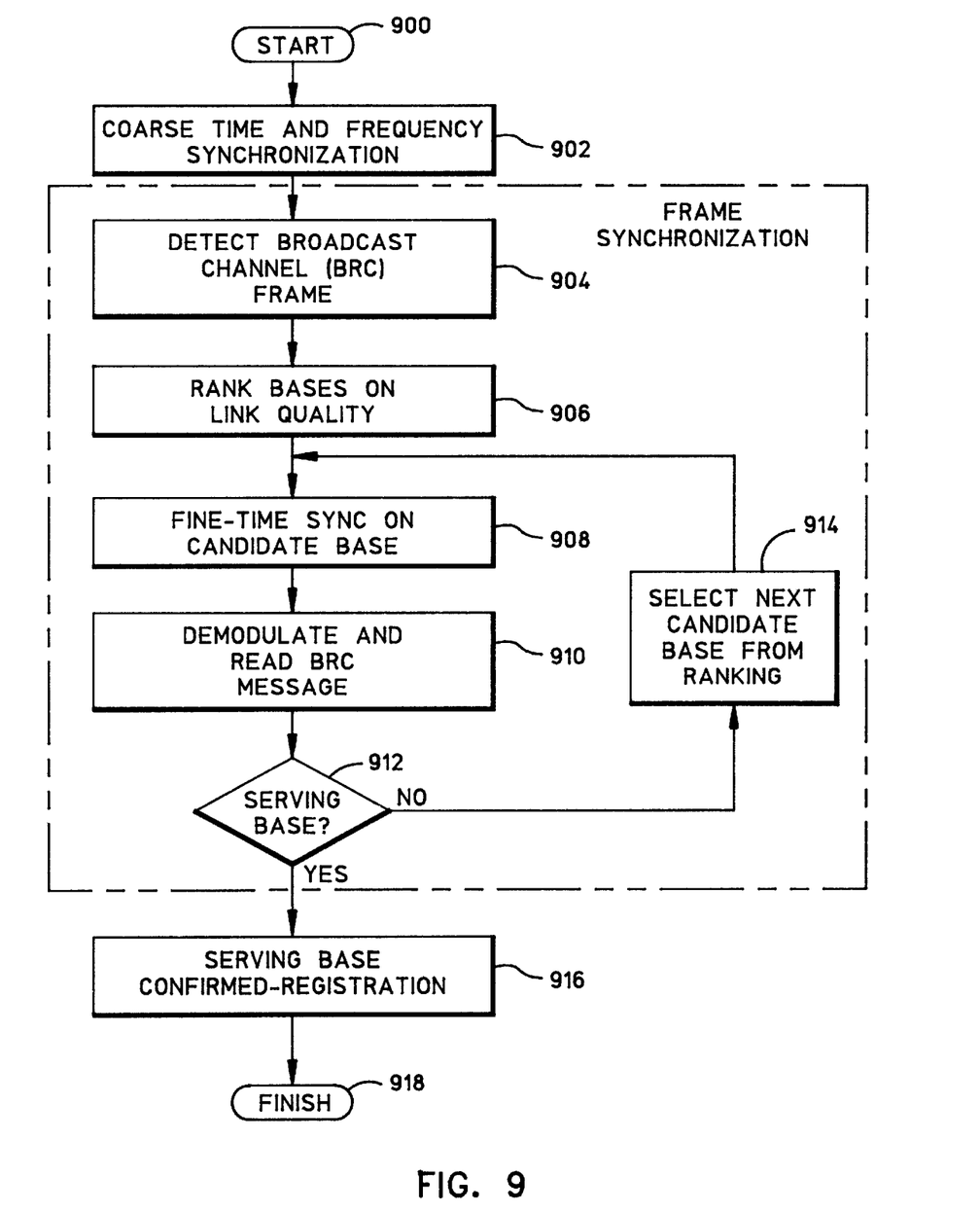
FIG. 9 is a flowchart describing a method for use in obtaining frame synchronization.

FIG. 9 is a flowchart describing a method for use in obtaining frame synchronization in wireless communication system 100 of FIG. 1. Beginning at a start block 900, receiver unit 104 performs a coarse time synchronization and a coarse frequency synchronization within wireless communication system 100 (step 902). Next, receiver unit 104 identifies the location of a BRC frame in the NAC (step 904). Preferably, step 904 is performed based on identifying the BRC pilot tone pattern (e.g., pattern 800 of FIG. 8) on the channel. Step 904 is more particularly performed as described later in relation to FIGS. 10–12.

Next, receiver unit 104 ranks the plurality of base units 110 in accordance with communication link quality (step 906). In this step, receiver unit 104 determines a signal level of the plurality of pilot tones within the CLC portion of each NAC frame. Because there are N base units involved, receiver unit 104 determines N signal levels for N consecutive NAC frames. The pilot powers may be computed and stored for each base unit based on $$P_k = \sum_{q}^{Q} \sum_{m}^{M} p_{q,m;k} * p_{q,m;k}$$

where $P_{q,m;k}$ is the complex value for pilot n at frequency bin m timeslot q within the Q timeslots that a base k is transmitting its pilot tones (here, Q=32). The receiver unit averages this quantity over multiple occurrences of the overall frame structure to mitigate any fading. The receiver unit ranks the base units according to the value Of $P_k$.

The ranking includes a list of the plurality of base units in order from the best to worst signal level. The first base unit in the rank corresponds to the base unit having the best signal level, which will typically be the base unit that is designated as the serving base unit for remote unit 104.

Next, receiver unit 104 performs a fine time synchronization process using pilot tones in the NAC frame corresponding to the first base unit in the rank (step 908). Step 908 may be performed more particularly as described in relation to FIG. 13. Receiver unit 104 then demodulates and reads a BRC message from the first base unit (step 910). The BRC message contains base unit identifying information which is compared to prestored serving base unit information in order to determine whether that base unit is the serving base unit for receiver unit 104 (step 912). If no match exists at step 912, then receiver unit 104 selects the next best candidate base unit from the rank (step 914) and processing repeats starting again at step 908. If a match exists at step 912, the base unit is confirmed as the serving base unit for receiver unit 104 and registration is performed (step 916). The flowchart ends at a finish block 918.

Figure 10:
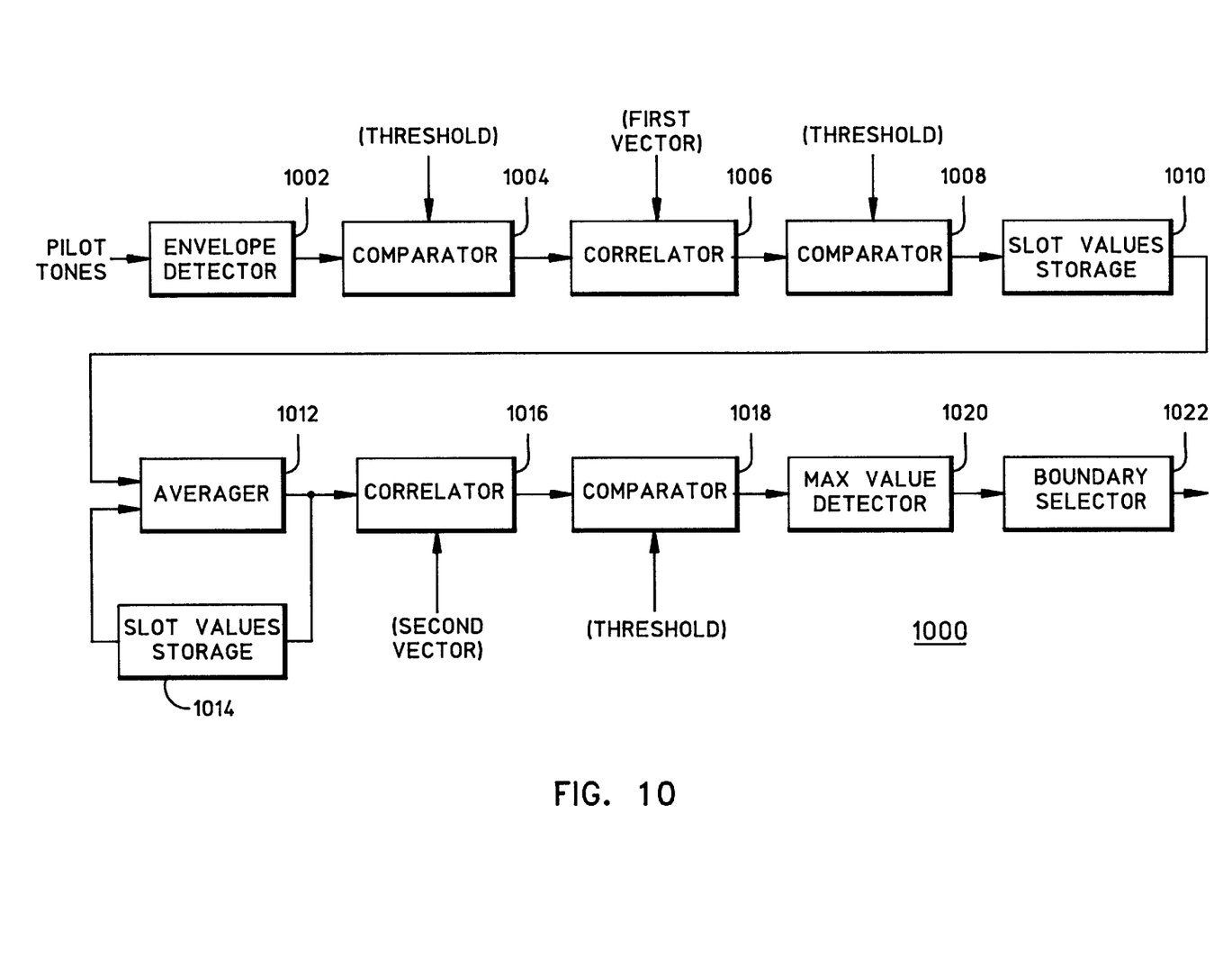
FIG. 10 is a block diagram of more specific electronic components of the receiver unit of FIG. 2, which is more closely related to the frame synchronization of the present invention.
Figure 11:
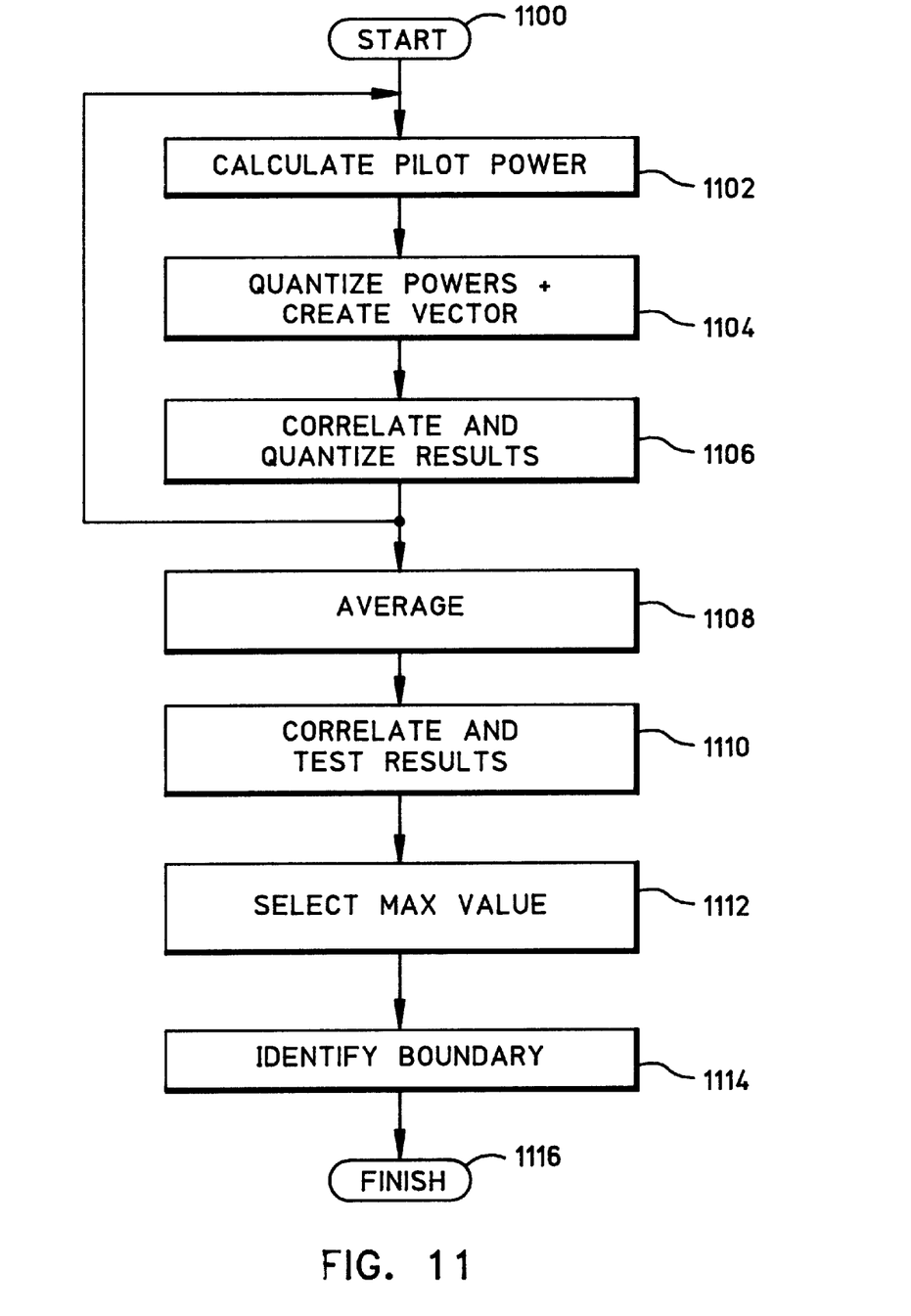
FIG. 11 is a flowchart describing a method for use in obtaining frame synchronization using the electronic components described in relation to FIG. 10.

FIG. 10 is a block diagram of more specific processing components 1000 of receiver unit 200 of FIG. 2, and FIG. 11 is a flowchart describing a method for use in obtaining frame synchronization using processing components 1000 described in relation to FIG. 10. Processing components 1000 of FIG. 10 and the flowchart of FIG. 11 describe a particular way of performing step 904 of FIG. 9. Data related to such processing are represented as shown in FIGS. 12A–12E.

Figures 12A, 12B, 12C:
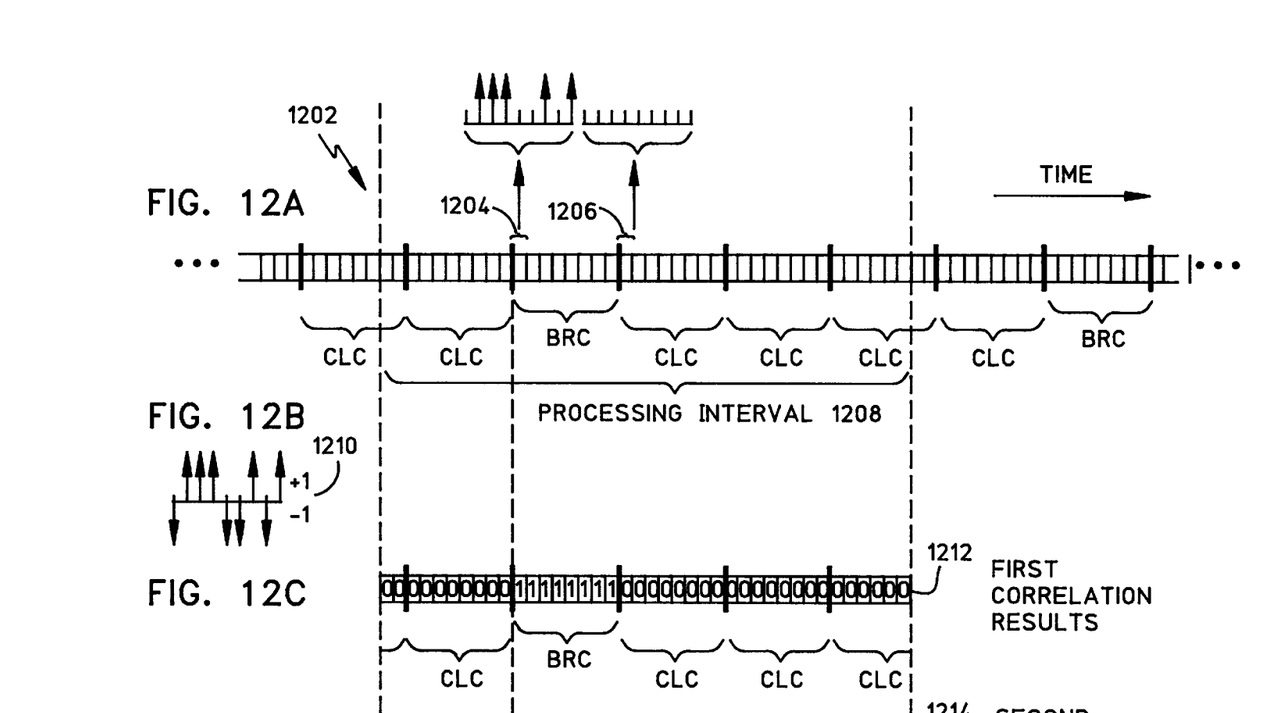
FIGS. 12A–12E are pilot tone processing diagrams related to the method described in relation to FIG. 11.
Figures 12D, 12E:
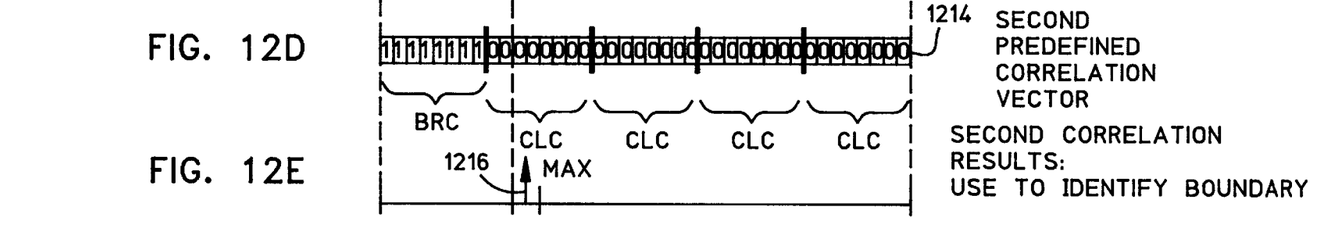

The following discussion refers to FIGS. 10, 11, and 12 in combination. Beginning at a start block 1100 of the flowchart in FIG. 11, a plurality of time-keyed pilot tones of a particular time slot are received, and the signal level or power of each pilot tone is calculated (step 1102). This step may be performed using an envelope detector 1002 shown in FIG. 10. Each power is quantized and a pilot tone vector is created (step 1104). Here, those pilots whose energy exceeds the threshold are represented by "1"; otherwise it is represented by "-1." This step may be performed using a comparator 1004 (FIG. 10).

Next, the pilot tone vector is correlated with a first predefined vector. The first predefined vector corresponds to the pilot tone pattern shown in FIG. 8, and may be represented by 011100101, where 1 is indicative of an active pilot tone position and 0 is indicative of an inactive pilot tone position. In implementation, the vector is represented as shown as data 1210 in FIG. 12B ("1" representing an expected existence of the pilot tone at the particular frequency, "−1" representing an expected non-existence of the pilot tone at the particular frequency). The output of the correlator will be maximum when the time-keyed pilots having the predetermined pilot tone pattern (FIG. 8) are detected. Step 1106 may be performed using a correlator 1006 shown in FIG. 10. The output of the correlator is quantized (also step 1106), being compared to a predefined threshold to determine whether the predetermined pilot tone pattern was detected or not. When the output exceeds the threshold, a value of "1" is stored; otherwise "0" is stored. This step may be performed using a comparator 1008 shown in FIG. 10.

As indicated in the flowchart of FIG. 11, steps 1102–1106 are repeated for each one of a plurality of time slots over the duration of a message frame. A pattern detection result is stored for each time slot (e.g., by a storage process 1010 shown in FIG. 10). As an example, processing interval 1208 in FIG. 12A may correspond to the plurality of time slots over which processing is performed. FIG. 12A shows a slot/frame data 1202 in the system, where each BRC time slot (such as BRC time slot 1204) has the predetermined pilot tone pattern and each CLC time slot (such as CLC time slot 1206) does not have the predetermined pilot tone pattern. Results of correlations over the duration of a message frame are exemplified by data 1212 in FIG. 12C ("1" indicating pilot tone pattern detection and a "0" indicating no pilot tone pattern detection). The number of values stored is equal to the number of time slots within the BRC, CLC, CLC, CLC, CLC duration. In this embodiment, there are 40 time slots (15 milliseconds worth), and therefore 40 values are stored.

Referring back to FIG. 11, an average of the correlation results is determined (step 1108). Here, steps 1102–1106 are again repeated for each time slot of a plurality of time slots over the duration of a message frame. As apparent, the averaging is performed over multiple message frame durations (e.g., multiple processing intervals 1208 in FIG. 12A) to store averaged pattern detection values. This step may be performed by an averager 1012 and storage process 1014 shown in FIG. 10.

Next, the averaged pattern detection values are correlated with a second predefined vector corresponding to a predetermined frame pattern (step 1110). The predefined frame pattern represents time slots having the predetermined pilot tone pattern and time slots not having the predetermined pilot tone pattern. The averaged pattern detection values may be represented by data 1212 in FIG. 12C, whereas the predetermined frame pattern may be represented by data 1214 in FIG. 12D. In this embodiment, the predetermined frame pattern is representable by 1111111100000000000000000000000000000000, where 1 is indicative of a detected predetermined pilot tone pattern and 0 is indicative of an undetected predetermined pilot tone pattern. The beginning of the BRC frame corresponds to the beginning of the predetermined frame pattern. Next, the output of correlator 1016 is tested (also step 1110), being compared to a predefined threshold to determine whether the pattern detection values adequately match the predetermined frame pattern. This added step may be performed using a comparator 1018 shown in FIG. 10.

Next, a maximum value from the correlation is selected (step 1112), and a boundary of the BRC message slot is identified or selected based on the relative location of the maximum value (step 1114). The boundary is identified more particularly based on the difference in location between the maximum value and the beginning/end of the predetermined frame pattern. See maximum value 1216 shown in FIG. 12E. Steps 1112 and 1114 may be performed by a max value detector 1020 and a boundary selector 1022 shown in FIG. 10. The flowchart of FIG. 11 ends at a finish block 1116, but may be repeated as necessary.

Advantageously, the receiver unit does not have to be provisioned to know its serving base unit prior to installation. The frame synchronization method allows the receiver unit to find the location of the broadcast message before it demodulates any data.

Figure 13:
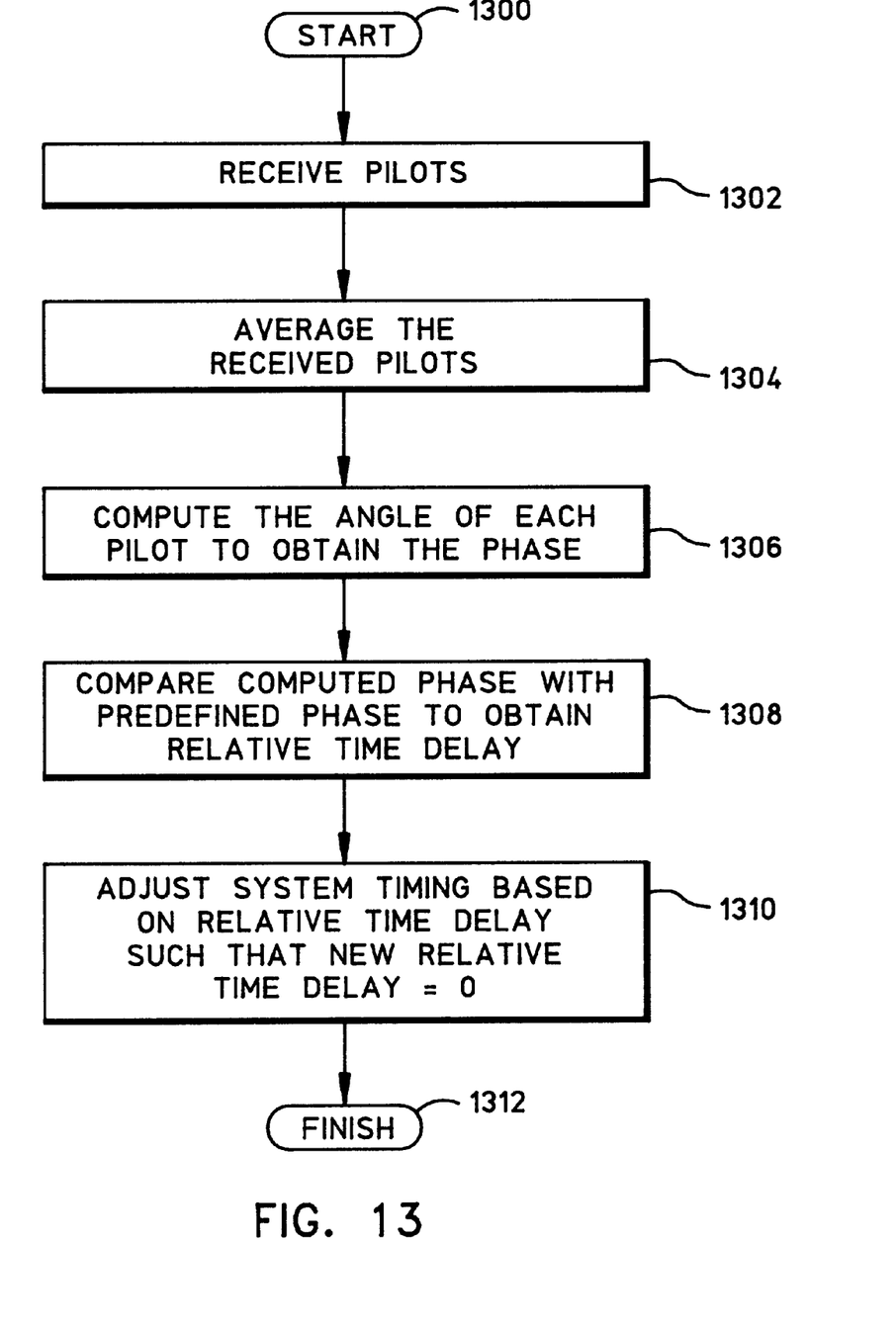
FIG. 13 is a flowchart describing a method for use in obtaining fine time synchronization in connection with the method described in relation to FIGS. 9–12.

FIG. 13 is a method for use in performing a fine time synchronization process in wireless communication system 100 of FIG. 1. More particularly, the method of FIG. 13 may be performed as step 908 in FIG. 9. Beginning at a start block 1300, receiver unit 104 receives time-keyed pilot tone pilots (step 1302). Receiver unit 104 averages the time-keyed pilots over a predetermined period of time (step 1304). Next, receiver unit 104 computes an angle of each pilot tone to obtain the phase of the pilot (step 1306). The computed phase is compared with a predefined phase to obtain a relative time delay (step 1308). Receiver unit 104 adjusts system timing based on the relative time delay, so as to reduce the relative time delay to zero (step 1310). The accuracy of this time adjustment allows any phase distortion of the signal constellation to be minimal such that the signal can be reliably demodulated. The flowchart ends at a finish block 1312.

As described in detail above, the inventive methods may involve the steps of, for each time slot of a plurality of time slots, where during one or more time slots a plurality of pilot tones having a first predetermined pattern is transmitted, and where during one or more other time slots the first predetermined pattern is not transmitted: receiving OFDM signals within a time slot; determining a signal level in the OFDM signals at each frequency of a plurality of pilot tone frequencies; comparing the signal levels in the OFDM signals with the first predetermined pattern; and detecting whether a match exists between the signal levels in the OFDM signals and the first predetermined pattern. This method includes the further step of identifying a boundary of a message slot based on results of the repeated receiving, determining, comparing, and detecting.

The step of detecting may involve storing a detection result, to thereby store a plurality of detection results associated with the plurality of time slots. Here, an additional step of comparing the plurality of detection results with a second predetermined pattern is performed. In this case, the step of identifying further involves identifying the boundary based on results of comparing the plurality of detection results with the second predetermined pattern. The step of comparing the plurality of detection results with the second predetermined pattern may involve performing a correlation between the plurality of detection results and the second predetermined pattern.

In the embodiments described, multiple time slots define a message slot and multiple message slots define a message frame. The step of detecting may involve storing a detection result, to thereby store a plurality of detection results associated with the plurality of time slots. The method may involve the further steps of repeating the repeated receiving, determining, comparing, and detecting over multiple message frame durations to generate a plurality of averaged detection results, where the results used to identify the boundary of the message slot comprise the plurality of averaged detection results. This may be achieved by comparing the plurality of averaged detection results with a second predetermined pattern, where identifying the boundary of the message slot further involves identifying the boundary based on results of comparing the plurality of averaged detection results with the second predetermined pattern. Again, the comparing may involve performing a correlation between the plurality of averaged detection results and a second predetermined pattern.

In the embodiments described, the first predetermined pattern comprises an active/inactive pilot tone pattern corresponding to 011100101, where 1 is indicative of an active pilot tone position and 0 is indicative of an inactive pilot tone position, and the second predetermined pattern comprises a detected/undetected pattern corresponding to 11111111000000000000000000000000000000000, where 1 is indicative of a detected first predetermined pattern and 0 is indicative of an undetected first predetermined pattern.

Other methods, which are combinable with the above-described methods, include the steps of, for each message frame of a plurality of message frames during which each base unit takes a turn in transmitting a plurality of pilot tone signals: receiving OFDM signals within a message frame; determining a signal level of a plurality of pilot tones in the OFDM signals; and generating a rank of the plurality of base units in accordance with the signal levels. This method includes the further steps of repeating the following steps if necessary until a serving base unit is confirmed: selecting a candidate base unit from the rank; decoding a message within the message frame associated with the selected candidate base unit; comparing a base unit identifier in the message and a prestored base unit identifier; and confirming that the candidate base unit is the serving base unit based on a match between the base unit identifier and the prestored base unit identifier.

Advantageously, the invention offers a means to achieve item (1) in the Background of the Invention without the degree of time synchronization required by other methods. The signal level of pilot tones used to achieve item (1) also serves as an indicator of which base unit is received at the receiver unit with the strongest signal. This allows the receiver unit to rank the base units based on signal strength, which in turn identifies which broadcast messages to decode, which thereby reduces the number of candidate messages to read.

It should be readily apparent and understood that the foregoing description is only illustrative of the invention and in particular provides preferred embodiments thereof. Various alternatives and modifications can be devised by those skilled in the art without departing from the true spirit and scope of the invention. Accordingly, the present invention is intended to embrace all such alternatives, modifications, and variations which fall within the scope of the appended claims.

What is claimed is:

1. A method for use in obtaining frame synchronization in an Orthogonal Frequency Division Multiplexing (OFDM) communication system, the OFDM communication system having a base unit which transmits a plurality of pilot tones in a first predetermined pattern in one or more time slots of a plurality of time slots, the method comprising:

receiving OFDM signals within a time slot;

determining a signal level in the OFDM signals at each frequency of a plurality of pilot tone frequencies;

comparing the signal levels in the OFDM signals with a first predetermined pattern;

detecting whether a match exists between the signal levels in the OFDM signals and the first predetermined pattern;

repeating the receiving, determining, comparing, and detecting for each time slot of the plurality of time slots; and identifying a boundary of a message slot based on results of the repeated receiving, determining, comparing, and detecting.

2. The method according to claim 1, wherein the message slot comprises a plurality of time slots.

3. The method according to claim 1, wherein multiple time slots define a message slot and multiple message slots define a message frame.

4. The method according to claim 1, further comprising:

wherein detecting comprises storing a detection result, to thereby store a plurality of detection results associated with the plurality of time slots;

comparing the plurality of detection results with a second predetermined pattern; and wherein identifying the boundary of the message slot further comprises identifying the boundary based on results of comparing the plurality of detection results with the second predetermined pattern.

5. The method according to claim 4, further comprising:

wherein comparing the plurality of detection results with the second predetermined pattern comprises performing a correlation between the plurality of detection results and the second predetermined pattern.

6. The method according to claim 4, wherein the second predetermined pattern comprises a detected/undetected pattern corresponding to 11111111000000000000000000000000000000000, where 1 is indicative of a detected first predetermined pattern and 0 is indicative of an undetected first predetermined pattern.

7. The method according to claim 1, wherein multiple time slots define a message slot and multiple message slots define a message frame, the method further comprising:

wherein detecting comprises storing a detection result, to thereby store a plurality of detection results associated with the plurality of time slots;

repeating the repeated receiving, determining, comparing, and detecting over multiple message frame durations to generate a plurality of averaged detection results; and wherein the results used to identify the boundary of the message slot comprise the plurality of averaged detection results.

8. The method according to claim 1, wherein multiple time slots define a message slot and multiple message slots define a message frame, the method further comprising:

wherein detecting comprises storing a detection result, to thereby store a plurality of detection results associated with the plurality of time slots;

repeating the repeated receiving, determining, comparing, and detecting over multiple message frame durations to generate a plurality of averaged detection results; and comparing the plurality of averaged detection results with a second predetermined pattern; and wherein identifying the boundary of the message slot further comprises identifying the boundary based on results of comparing the plurality of averaged detection results with the second predetermined pattern.

9. The method according to claim 1, wherein multiple time slots define a message slot and multiple message slots define a message frame, the method further comprising:

wherein detecting comprises storing a detection result, to thereby store a plurality of detection results associated with the plurality of time slots;

repeating the repeated receiving, determining, comparing, and detecting over multiple message frame durations to generate a plurality of averaged detection results; and performing a correlation between the plurality of averaged detection results and a second predetermined pattern; and wherein identifying the boundary of the message slot further comprises identifying the boundary based on performing the correlation.

10. The method according to claim 1, wherein the first predetermined pattern comprises an active/inactive pilot tone pattern corresponding to 011100101, where 1 is indicative of an active pilot tone position and 0 is indicative of an inactive pilot tone position.

11. A method for use in obtaining frame synchronization in an Orthogonal Frequency Division Multiplexing (OFDM) communication system, the OFDM communication system including a base unit which transmits a plurality of pilot tones having a first predetermined pattern in one or more time slots of a plurality of time slots, thereby defining a second predetermined pattern of one or more time slots having the first predetermined pattern and one or more other time slots not having the first predetermined pattern, the method comprising:

receiving OFDM signals within a time slot;

determining a signal level in the OFDM signals at each frequency of a plurality of pilot tone frequencies;

comparing the signal levels in the OFDM signals with the first predetermined pattern;

detecting whether a match exists between the signal levels in the OFDM signals and the first predetermined pattern;

storing a detection result;

repeating the receiving, determining, comparing, detecting, and storing for each time slot of a plurality of time slots, to thereby produce a plurality of detection results;

comparing the plurality of detection results and the second predetermined pattern; and identifying a boundary of a message slot based on results of the comparing.

12. The method according to claim 11, further comprising:

wherein the plurality of pilot tones having the first predetermined pattern are simultaneously broadcasted by each base unit of a plurality of base units.

13. The method according to claim 11, wherein multiple time slots define a message slot and multiple message slots define a message frame.

14. The method according to claim 11, further comprising:

repeating the repeated receiving, determining, comparing, detecting, and storing over multiple message frame durations to generate a plurality of averaged detection results; and wherein comparing the plurality of detection results with the second predetermined pattern comprises comparing the plurality of averaged detection results with the second predetermined pattern.

15. The method according to claim 11, wherein the first predetermined pattern comprises an active/inactive pilot tone pattern corresponding to 011100101, where 1 is indicative of an active pilot tone position and 0 is indicative of an inactive pilot tone position.

16. The method according to claim 11, wherein the second predetermined pattern comprises a detected/undetected pattern corresponding to 111111110000000000000000000000000000000, where 1 is indicative of a detected first predetermined pattern and 0 is indicative of an undetected first predetermined pattern.

17. A method for use in obtaining frame synchronization in an Orthogonal Frequency Division Multiplexing (OFDM) communication system, the OFDM communication system including a plurality of base units which simultaneously transmit a plurality of pilot tones in a predetermined pilot tone pattern during some of a plurality of time slots of a message slot but do not simultaneously transmit the predetermined pilot tone pattern during some of the other time slots in the message slot, the method comprising:

receiving OFDM signals within a time slot;

determining a signal level in the OFDM signals at each frequency of a plurality of pilot tone frequencies;

performing a correlation between the signal levels and the predetermined pilot tone pattern;

generating and storing a pattern detection value based on performing the correlation;

repeating the receiving, determining, performing, generating and storing for each time slot of the plurality of time slots;

repeating, for a plurality of message frame durations, the above steps of repeated receiving, determining, performing, and generating to produce a plurality of averaged pattern detection values; and performing a correlation between the plurality of averaged pattern detection values and a predetermined message frame pattern; and detecting a boundary of a message slot based on performing the correlation.

18. The method according to claim 17, wherein the predetermined pilot tone pattern comprises an active/inactive pilot tone pattern corresponding to 011100101, where 1 is indicative of an active pilot tone position and 0 is indicative of an inactive pilot tone position.

19. The method according to claim 17, wherein the predetermined message frame pattern corresponds to 111111110000000000000000000000000000000, where 1 is indicative of a detected predetermined pilot tone pattern and 0 is indicative of an undetected predetermined pilot tone pattern.

20. The method according to claim 17, wherein the predetermined pilot tone pattern comprises a first predetermined pilot tone pattern, and wherein each base unit takes a turn, on a message frame by message frame basis, to broadcast a plurality of pilot tones in a second predetermined pilot tone pattern during the other time slots of the plurality of time slots, the method further comprising:

receiving OFDM signals within a message frame;

determining a signal level in the OFDM signals at each frequency of a plurality of pilot tone frequencies;

repeating the above receiving and determining for each message frame of a plurality of message frames to produce a plurality of signal levels;

identifying a maximum signal level from the plurality of signal levels; and selecting a message frame for decoding messages based on identifying the maximum signal level.

21. The method according to claim 20, further comprising:
   decoding a message within the selected message frame.
22. The method according to claim 20, further comprising:
   decoding a message within the selected message frame;
   comparing a base unit identifier in the message with a prestored base unit identifier; and
   confirming whether the selected message frame is accurate based on comparing the base unit identifier with the prestored base unit identifier.
23. A method for use in obtaining frame synchronization in an Orthogonal Frequency Division Multiplexing (OFDM) communication system having a plurality of base units, each base unit taking a turn in transmitting a plurality of pilot tone signals over a plurality of message frames, the method comprising:
   receiving OFDM signals within a message frame;
   determining a signal level of a plurality of pilot tones in the OFDM signals;
   repeating the receiving and determining for each message frame of a plurality of message frames to produce a plurality of signal levels associated with the plurality of base units;
   identifying a maximum signal level from the plurality of signal levels; and
   selecting a message frame for decoding messages based on the identified maximum signal level.
24. The method according to claim 21, further comprising:
   performing fine time synchronization after selecting the message frame for decoding messages.
25. The method according to claim 21, further comprising:
   performing at least a coarse time synchronization process and at least a coarse frequency synchronization process prior to the receiving and the determining.
26. The method according to claim 21, further comprising:
   generating a rank of the plurality of base units in accordance with the signal levels.
27. The method according to claim 21, further comprising:
   generating a rank of the plurality of base units in accordance with the signal levels; and
   wherein identifying the frame boundary for decoding messages comprises selecting a first one in the rank.
28. A method for use in obtaining frame synchronization in an Orthogonal Frequency Division Multiplexing (OFDM) communication system including a plurality of base units, each base unit taking a turn in transmitting a plurality of pilot tone signals over a plurality of message frames, the method comprising:
   receiving OFDM signals within a message frame;
   determining a signal level of a plurality of pilot tones in the OFDM signals;
   repeating the receiving and determining for each message frame of a plurality of message frames to produce a plurality of signal levels;
   generating a rank of the plurality of base units in accordance with the signal levels;
   repeating the following steps if necessary until a serving base unit is confirmed:
      selecting a candidate base unit from the rank;
      decoding a message within the message frame associated with the selected candidate base unit;
      comparing a base unit identifier in the message and a prestored base unit identifier; and
      confirming that the candidate base unit is the serving base unit based on a match between the base unit identifier and the prestored base unit identifier.
29. The method according to claim 28, further comprising:
   performing at least a coarse time synchronization process and at least a coarse frequency synchronization process prior to the receiving and the detecting.
30. A method for use in obtaining frame synchronization in an Orthogonal Frequency Division Multiplexing (OFDM) communication system, the OFDM communication system having a plurality of base units which simultaneously broadcast a plurality of pilot tones in a predetermined pilot tone pattern during one or more time slots of a plurality of time slots, the plurality of time slots defining boundaries of a message slot, a plurality of message slots defining boundaries of a message frame, each base unit taking a turn on a message frame by message frame basis to transmit all of the plurality of pilot tones during the other time slots of the plurality of time slots, the method comprising:
   receiving OFDM signals within a time slot;
   determining a signal level in the OFDM signals at each frequency of a plurality of pilot tone frequencies;
   performing a correlation between the signal levels and the predetermined pilot tone pattern;
   generating and storing a pattern detection value based on performing the correlation;
   repeating the receiving, determining, performing, and generating and storing for each time slot of a plurality of time slots over a message slot duration;
   repeating, for a plurality of message frame durations, the above steps of repeated receiving, determining, performing, and generating to produce a plurality of averaged pattern detection values;
   performing a correlation between the plurality of averaged pattern detection values and a predetermined message frame pattern;
   detecting a boundary of a message slot based on performing the correlation;
   receiving OFDM signals within one of the other time slots;
   determining a signal level of a plurality of pilot tones in the OFDM signals;
   repeating the receiving and determining for each of the other time slots within the message frame to produce a plurality of signal levels;
   generating a rank of the plurality of base units in accordance with the plurality of signal levels;
   repeating the following steps if necessary until a serving base unit is confirmed:
      selecting a candidate base unit from the rank based on its associated signal level;
      decoding a message within a message frame associated with the selected candidate base unit;
      comparing a base unit identifier in the message and a prestored base unit identifier; and
      confirming that the candidate base unit is the serving base unit based on a match between the base unit identifier and the prestored base unit identifier.

* * * * *